US007095326B2

(12) United States Patent
Young et al.

(10) Patent No.: US 7,095,326 B2
(45) Date of Patent: Aug. 22, 2006

(54) CHARACTERIZING A CARGO CONTAINER

(75) Inventors: Phillip E. Young, Temecula, CA (US); Wayne D. Cornelius, San Diego, CA (US); William Leslie Hicks, Escondido, CA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 10/430,260

(22) Filed: May 7, 2003

(65) Prior Publication Data

US 2004/0222888 A1    Nov. 11, 2004

(51) Int. Cl.
*G08B 13/14* (2006.01)
(52) U.S. Cl. ............... 340/572.4; 340/572.2; 340/572.5
(58) Field of Classification Search ............ 340/572.1, 340/572.2, 572.4, 572.5, 572.8, 571, 568.1, 340/825.49, 5.1; 342/42, 124, 127; 324/633
See application file for complete search history.

(56) References Cited

U.S. PATENT DOCUMENTS

| | | | | |
|---|---|---|---|---|
| 3,569,827 A | * | 3/1971 | Dryden et al. | ............. 324/633 |
| 5,396,251 A | * | 3/1995 | Schuermann | ................. 342/51 |
| 5,734,346 A | * | 3/1998 | Richardson et al. | ......... 342/124 |
| 6,130,623 A | * | 10/2000 | MacLellan et al. | .......... 340/5.1 |
| 6,396,438 B1 | * | 5/2002 | Seal | ........................... 342/127 |

OTHER PUBLICATIONS

International Search Report for Application No. PCT/US04/02940, dated Nov. 30, 2004 (mailing date).
Written Opinion for Application No. PCT/US04/02940, dated Nov. 30, 2004 (mailing date).
Preliminary Examination Report for Application No. PCT/US04/02940, dated Mar. 15, 2005 (mailing date).

* cited by examiner

*Primary Examiner*—Van T. Trieu
(74) *Attorney, Agent, or Firm*—Kilpatrick Stockton LLP

(57) ABSTRACT

Characterizing a cargo container and its contents. A system comprising an emitter to emit radio frequency (RF) energy, a receiver to receive an RF response related to the energy, and a processor operative to compare a plurality of RF responses. A method for characterizing a cargo container and its contents, the method including providing a system as described above, via the system: emitting a RF energy within a container, receiving an RF response of the container and the container contents, emitting a second RF energy within a container, receiving a second RF response of the container and the container contents, and comparing the second RF response with the first RF response.

14 Claims, 11 Drawing Sheets

CHARACTERIZING A CARGO CONTAINER

CROSS-REFERENCE TO RELATED APPLICATIONS

Not applicable.

BACKGROUND OF THE INVENTION

Today the bulk of goods shipped from international destinations to the United States (U.S.) arrive in steel cargo containers. The vast majority of these containers comes in one of two common varieties: 8' by 8' by 20', i.e., one Twenty-foot Equivalent Unit (TEU); and 8' by 8' by 40', i.e., two TE forty million TEUs arrive in the U.S. in each year. One of the primary missions of U.S. Customs Service has been the inspection of these cargo containers for manifest verification and contraband detection. The heightened threat of weapons of mass destruction (WMD) being transported through this shipping modality has resulted in a significant interest in methods of insuring the integrity of the containers from offshore manufacture or shipper to its US destination. Sealing the container alone is not sufficient to insure the integrity of the shipping container contents. Studies show that the most sophisticated sealing mechanism remains defeatable by those whose mission it is to affect the contents of the container. In addition, volume alone makes detailed individual inspection of each container resource-intensive if not infeasible. National security issues drive an increasing level of vigilance to reduce the risk of admitting dangerous contents into the country.

One approach to managing the security concerns associated with allowing containers to enter the U.S., without detailed individual inspection upon arrival, is to have a trusted shipper or an Independent Goods Inspector (IGI) inspect the container when the cargo is loaded. After inspection and loading, the container is sealed. Subsequently, those containers bearing seals that show signs of tampering can be selected for detailed individual inspection. The use of seals, while potentially effective to indicate tampering through the container door, does not address tampering through other methods, e.g., entry through the sides or ends of the container.

A pulse of energy introduced into a hollow conductive box will cause the box to respond at its resonant frequencies. Such a box can be visualized as a waveguide shorted at each end. Such a waveguide can support a stationary wave pattern of only those resonant modes whose frequencies lead to an integral number of half-wavelengths between opposite conductive walls of the waveguide. A rectangular waveguide of dimensions a×b×d has resonant frequencies at $f_{mnq}$ given in Equation 1—where m, n, and q are integers describing the number of half-wavelengths between the a, b, and d walls respectively. The integers m, n, and q collectively represent a mode of the resonant response whose frequency is:

$$f_{mnq} = \frac{c}{2\pi\sqrt{\mu_R \varepsilon_R}} \sqrt{\left(\frac{m\pi}{a}\right)^2 + \left(\frac{n\pi}{b}\right)^2 + \left(\frac{q\pi}{d}\right)^2} \quad (1)$$

In Equation 1, c is the velocity of light while $\varepsilon_R$ and $\mu_R$ are the relative electrical permittivity and magnetic permeability of the dielectric media—nominally air, in which case $\varepsilon_R = \mu_R = 1$.

The quality factor, Q, is a common parameter used to describe the relative "strength" of any particular resonant mode and is defined as the energy stored in the system divided by the energy lost per radio frequency (RF) cycle. The Q is also equal to the resonant frequency divided by the bandwidth at the half-power points of the response curve. The larger the Q-value, the higher the peak response of the resonance and the narrower its width. An infinite Q-value would correspond to a mode with infinite response and zero bandwidth. In our example rectangular cavity with dimensions a×b×d, the Q of the lowest frequency Transverse Electric (TE) mode {m=1, n=0, q=1} can be expressed as:

$$Q_{101} = \frac{(kad)^3 b\eta}{2\pi^2 R_s} \frac{1}{(2a^3 b + 2bd^3 + a^3 d + ad^3)} \quad (2)$$

where $k=2\pi/\lambda$ ($\lambda$ is the wavelength), $\eta^2 = \mu/\varepsilon = \mu_0 \mu_R / \varepsilon_0 \varepsilon_R$, and $R_s$ is the resistivity of the metal walls of the waveguide. The higher the Q, the greater the system response to a stimulus and the more easily that response is to identify compared with background electronic noise.

FIG. 1 is a plot of the theoretical modes of a one TEU equivalent copper waveguide. The individual curves are labeled with their m and n mode numbers respectively, and are shown as a function of the longitudinal mode number q. Because the waveguide has a square cross-section, the plots produced by switching m and n are equivalent (e. g. the horizontal and vertical modes are degenerate in frequency). The observable mode structure of an empty container would be the projection of the "dots" in FIG. 1 onto the vertical axis—a large number of overlapping resonant modes.

BRIEF SUMMARY OF THE INVENTION

Preferred embodiments of the system include an emitter, a receiver, and a processor. The emitter is operative to emit RF energy. The receiver is operative to receive the RF response related to the emitted energy. The processor is operative to compare a plurality of RF responses.

Preferred embodiments also include a method for characterizing a cargo container. The method includes: providing a system as described above, emitting a RF energy within a container, receiving a response of the container and the container contents, emitting a second RF energy within a container at a later time, receiving a response of the container and the container contents to the second RF energy; and comparing the second RF response with the first RF response.

Further embodiments include a cargo container comprising an emitter antenna and a receive antenna. The emitter antenna is located inside the container, and operative to transmit RF energy at frequencies above the lowest resonant frequencies of the empty container. The receive antenna is located inside the container operative to receive RF energy at frequencies substantially above the lowest resonant frequencies of the empty container. The emitter antenna and receive antenna(s) are accessible for energizing/reading from outside the container. These embodiments are compatible with transmitter, receiver, processor, communications, and user interface subsystems located outside the container. In other embodiments, an earlier RF signature is associated with the container and the authorized contents of the container. In still other embodiments, the container is associated with characterizing marks (such as a bar code) indicative of the resonant frequency response characteristic of the container as loaded. In some embodiments employing characterizing marks, the characterizing marks are discernable from outside the container.

Still further methods for detecting changes in the composition or distribution of cargo within a cargo container include the use of a container having associated with it a first RF signature of the container and its inspected contents. In these methods, a second RF signature of the container and its contents is determined, and the second RF signature is compared with the first RF signature.

BRIEF DESCRIPTION OF THE SEVERAL VIEWS OF THE DRAWINGS

Each drawing is exemplary of the characteristics and relationships described thereon in accordance with preferred embodiments of the present invention.

FIG. 5 illustrates the difference spectrum for a steel one-TEU container loaded with an 8 ft.$^3$ cargo pallet of indeterminate electromagnetic permeability where the second reading was taken after moving the pallet 2 in.

FIG. 6 shows the RFR signatures with a cargo pallet moved 6 in.

DETAILED DESCRIPTION OF THE INVENTION

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

A closed metal cargo shipping container can be modeled as a rectangular waveguide shorted at each end. Real metal cargo containers are not ideal rectangular waveguides, and in general contain irregularities in surface features, dimensions, and electromagnetic properties that are not accounted for in a model such as the one discussed above. The addition of cargo to the container will introduce spatial variations in the relative electric permittivity and magnetic permeability inside the cargo container. Different distributions of cargo within the container will result in different response spectra for the same cargo. Changes in the composition of cargo will also result in a changed response spectrum. The introduction of dielectric and metallic objects within the container modifies the mode structure in a pattern that is effectively unique to the contents and distribution of those contents within the container. In addition, any breach in the integrity of the container (cut holes, doors opened, etc) will change the baseline mode structure of the container. Hence, a measurement of the mode spectrum of the container and contents—the frequency resonance (RFR) signature—provides a spectrum akin to a "fingerprint" of the container and the particular composition and distribution of the container's contents.

Figure 2:
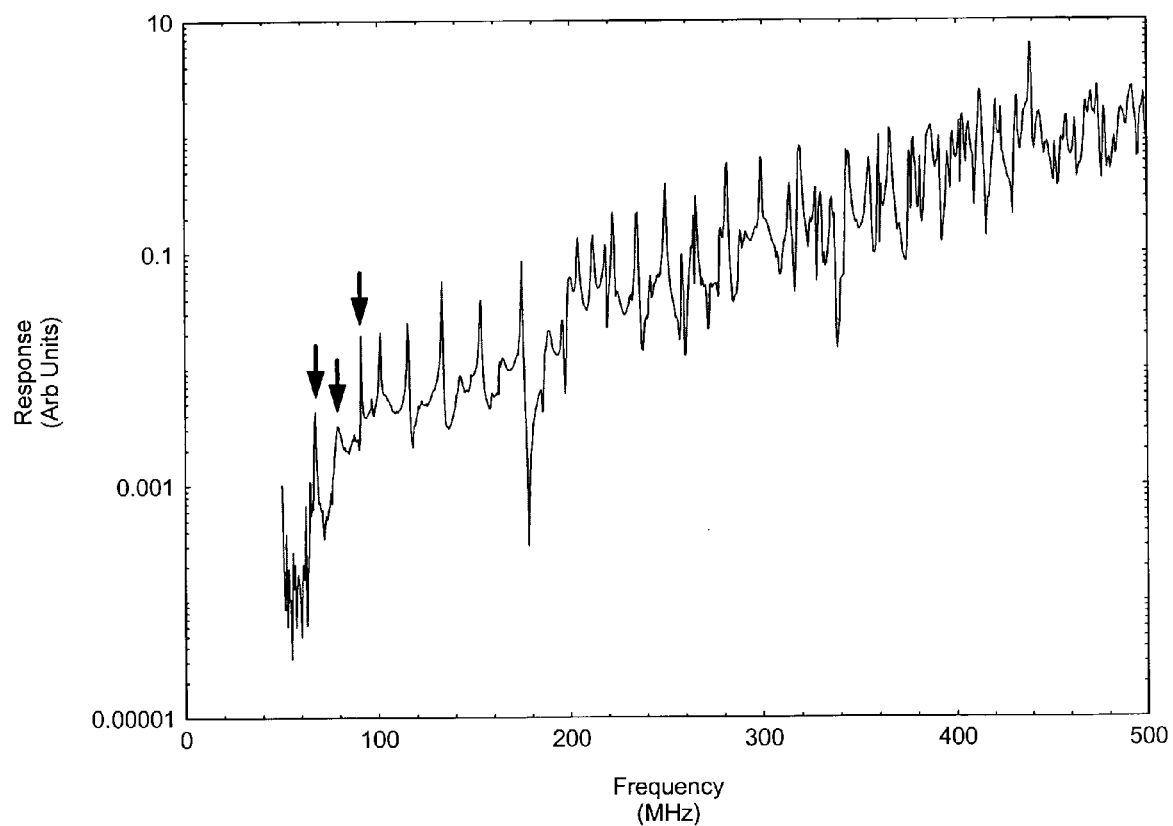
FIG. 2 is an actual spectrum (semi-log plot) for an empty one-TEU steel cargo container.
Figure 3:
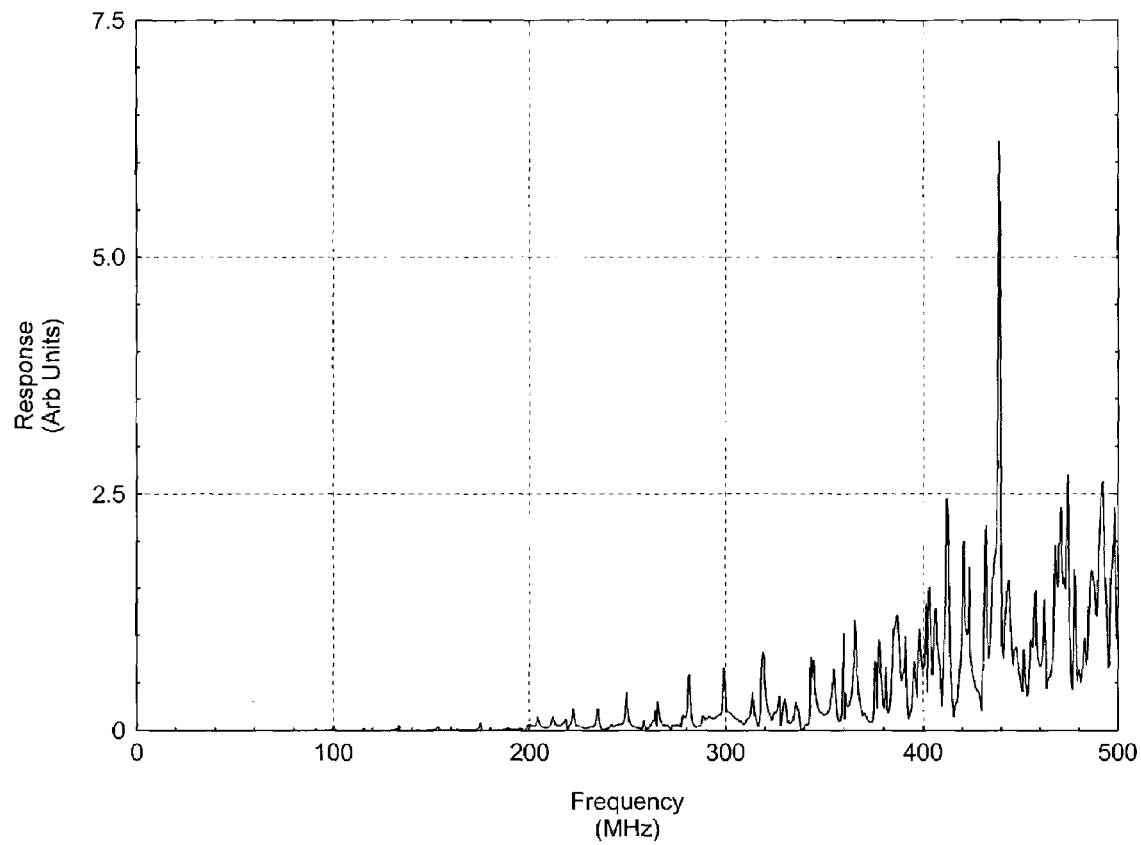
FIG. 3 is a linear plot of the Radio Frequency Resonance (RFR) signature of FIG. 2.

An example RFR spectrum for an actual one-TEU steel cargo container (empty) is shown in FIG. 2 (semi-log plot) and in FIG. 3 (linear plot). As illustrated by equation (1) above, the lower frequencies are primarily determined by the dimensions of the container and are not appreciably altered by its contents. The arrows in FIG. 2 indicate the three lowest-order $TE_{10q}$ modes described by equation (1). Note that the signal strength increases by a factor of more than one hundred at the upper frequencies as compared with the lower frequencies.

One method of comparing measured frequency spectra is to subtract one spectrum from another, square the difference at each frequency, and add all of the squared differences together to produce a single positive-definite parameter that is indicative of the total difference between the two spectra. Other methods can be used to compare spectra, however. The sum of the squared differences is used herein but should not be construed to be the only method for quantifying changes in RFR signatures.

Figure 4:
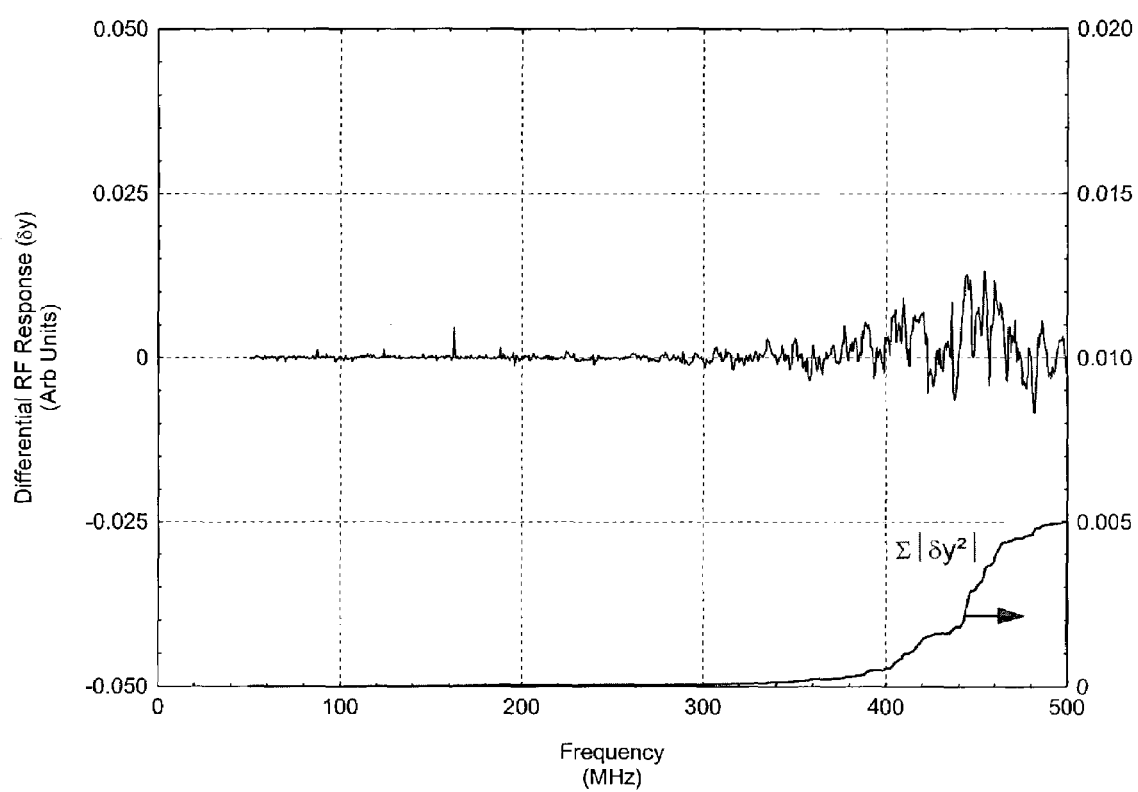
FIG. 4 shows the difference between RFR signatures obtained before and after opening, then re-closing the door of a one-TEU container.
Figure 5:
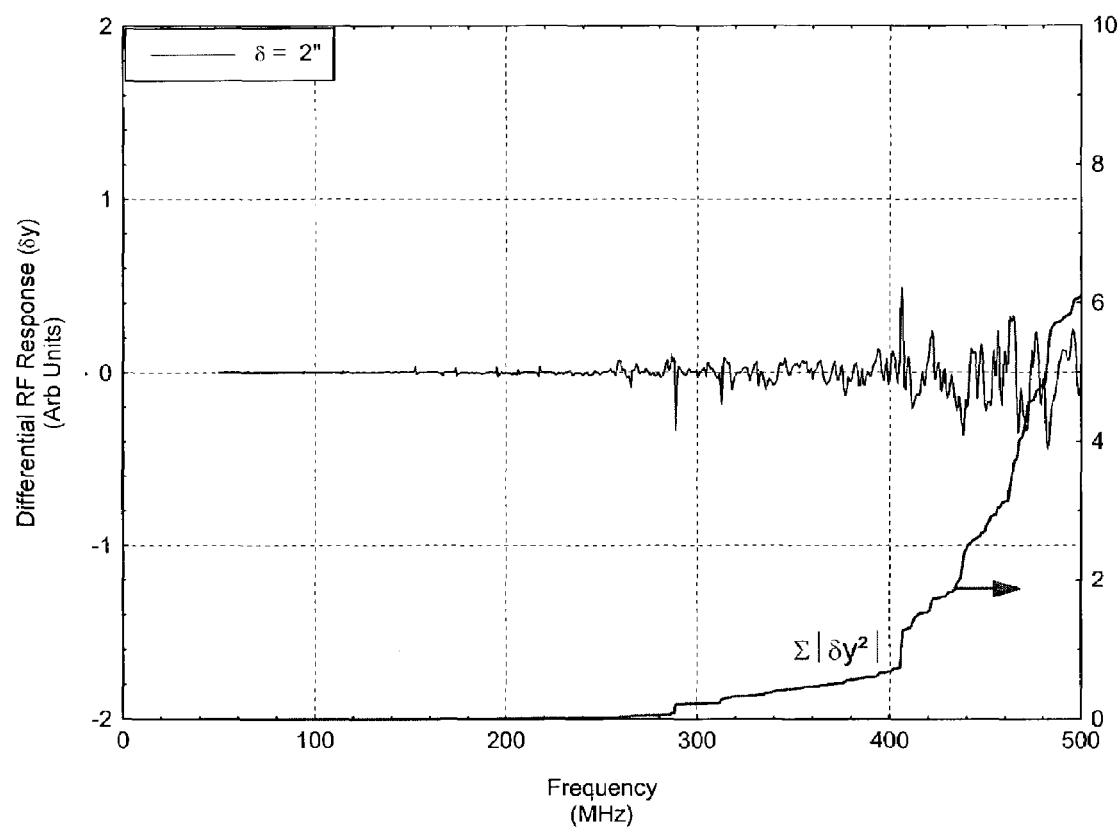

FIG. 4 illustrates the difference between RFR signatures obtained before and after opening, then re-closing the door of a container. Such a small change minimally affects the RFR signature. The running sum of the squared differences is given by the line at the lower right of FIG. 4. As can be seen from FIG. 4, the overall sum of the squared differences is 0.005 (arbitrary units). Experiments demonstrate that sums of squared differences for such minimally-affected systems typically range between 0.001 and 0.05 units, verifying the short-term reproducibility of the RFR signature measurement. FIG. 5 illustrates the difference spectrum for a steel TEU loaded with an 8 ft.$^3$ cargo pallet of indeterminate electromagnetic permeability where the second reading was taken after moving the pallet 2 in. Again, the running sum of the squared differences is given by the line at the lower right in the figure. In this particular example, the sum of the squared differences is equal to 6.09. Note however that the major contribution to the sum of squared differences is manifested in frequencies above 300 MHz. This result appears typical of RFR signature measurements in a one-TEU container.

In repeated trials, with different placement of emitter and receiver antennae relative to the cargo, the sum of the squared differences for equivalent cargo displacements for this particular example varied between 3 and 10 units. The differences between the specific values represent differing responses to placement cargo relative to the emitter and receiver antennae. In general, the closer the receive antenna is to the changed portions of the cargo, the larger the SNR indicating changes in cargo location.

A number of alternative combinations of emit and receive antenna locations were tried in an attempt to identify an optimum relationship. Rather than finding an optimum relationship, it was determined that the particular response of the RFR signature is dependent on the proximity of the receive antenna to the cargo pallet and to the relative orientations of the emit and receive antennae. Different antenna orientations have different coupling factors to various RF modes. For example, a loop antenna (producing primarily magnetic RF excitation) cannot couple to an RF mode that has an electric field maximum (magnetic field minimum) at that loop's location nor to an RF mode where the magnetic field component is perpendicular to the axis of the loop. Hence different loop placements and orientations tend to excite different modes with differing efficiencies. Note however that the responses obtained with substantially identical loop placements and orientations were virtually identical as long as the positioning of the cargo remained constant. Hence the RFR signature remains stable for each combination of antenna placement and orientation.

Using the summed squared difference value from FIG. 4 (before opening and closing container doors, after opening and closing container doors) as a noise baseline (0.005 units), the signal-to-noise ratio (SNR) for the sum of the squared differences shown in FIG. 5 (6.09 units) is approximately 1200:1—more than sufficient to distinguish real changes from background noise. Similar measurements made with a nearly full and completely full one-TEU container showed sufficient sensitivity to detect displacement of a 2"×4"×8" lead brick by less than 2" in any direction. This is sensitivity to displacement of relatively small metallic objects inside the much larger volume.

Figure 6:
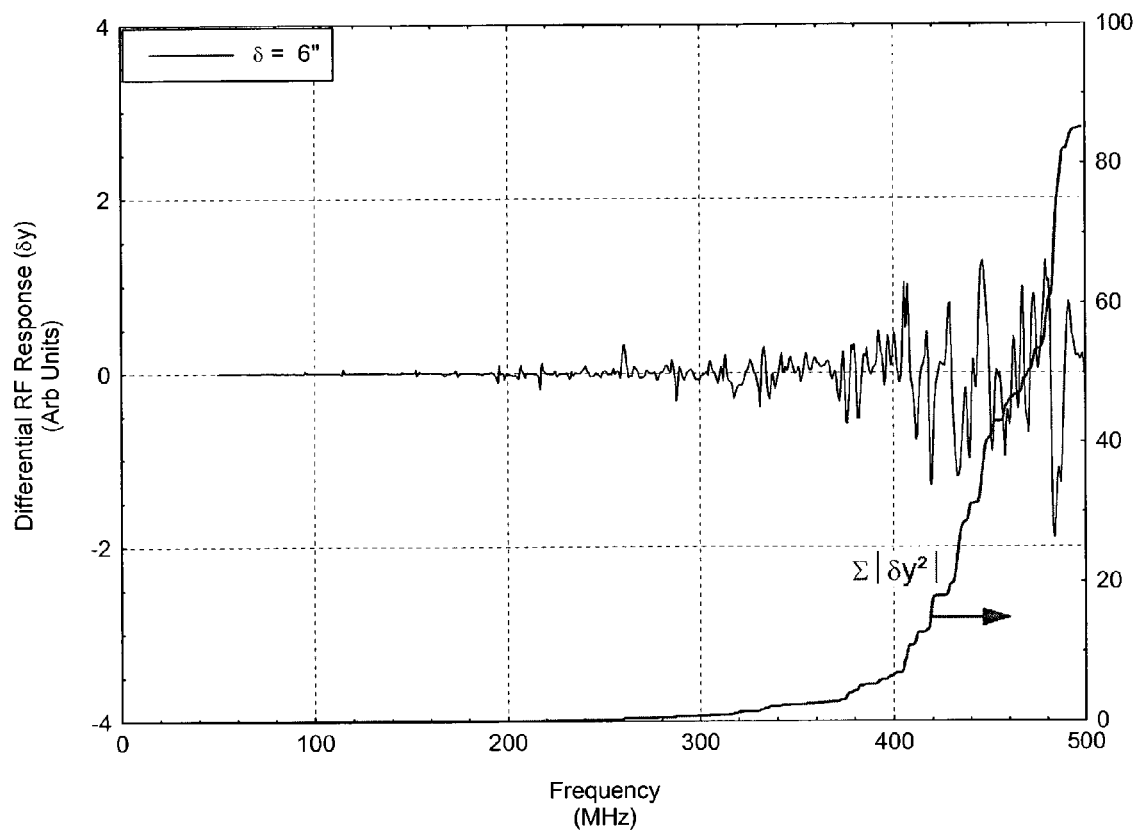
Figure 7:
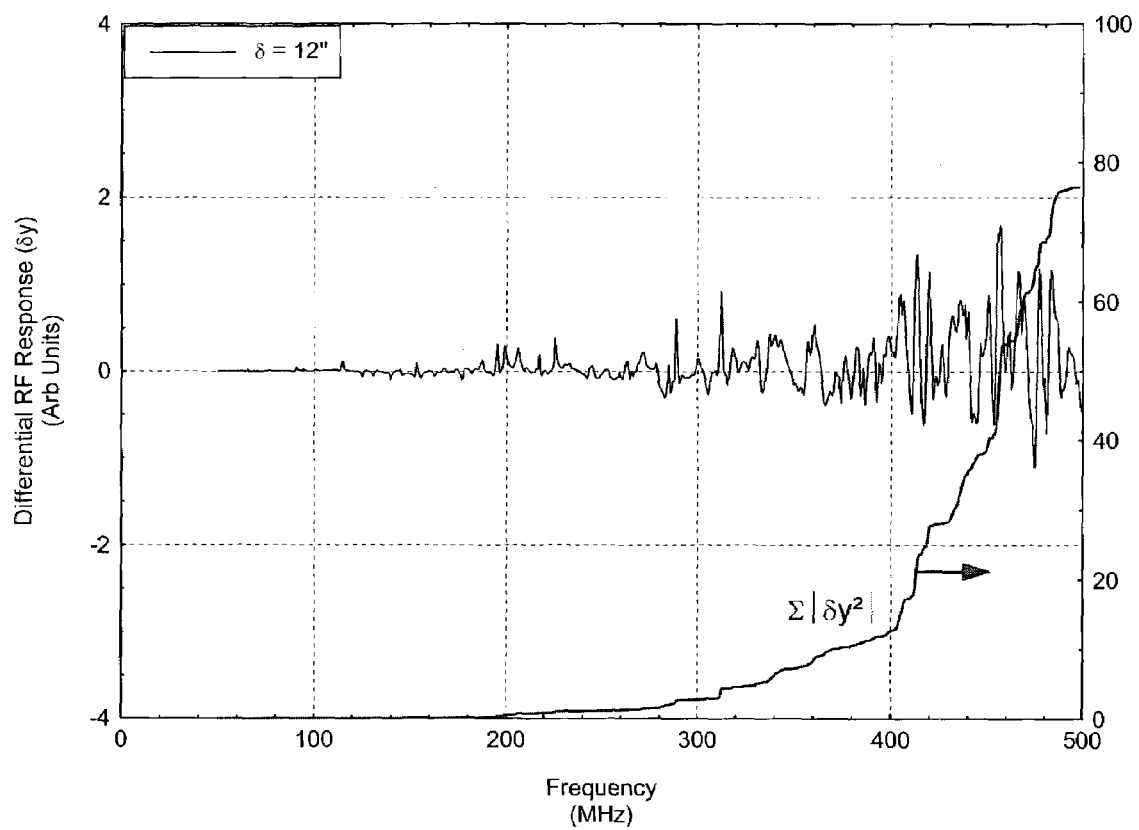
FIG. 7 shows RFR signatures with a cargo pallet moved 1 ft.
Figure 8:
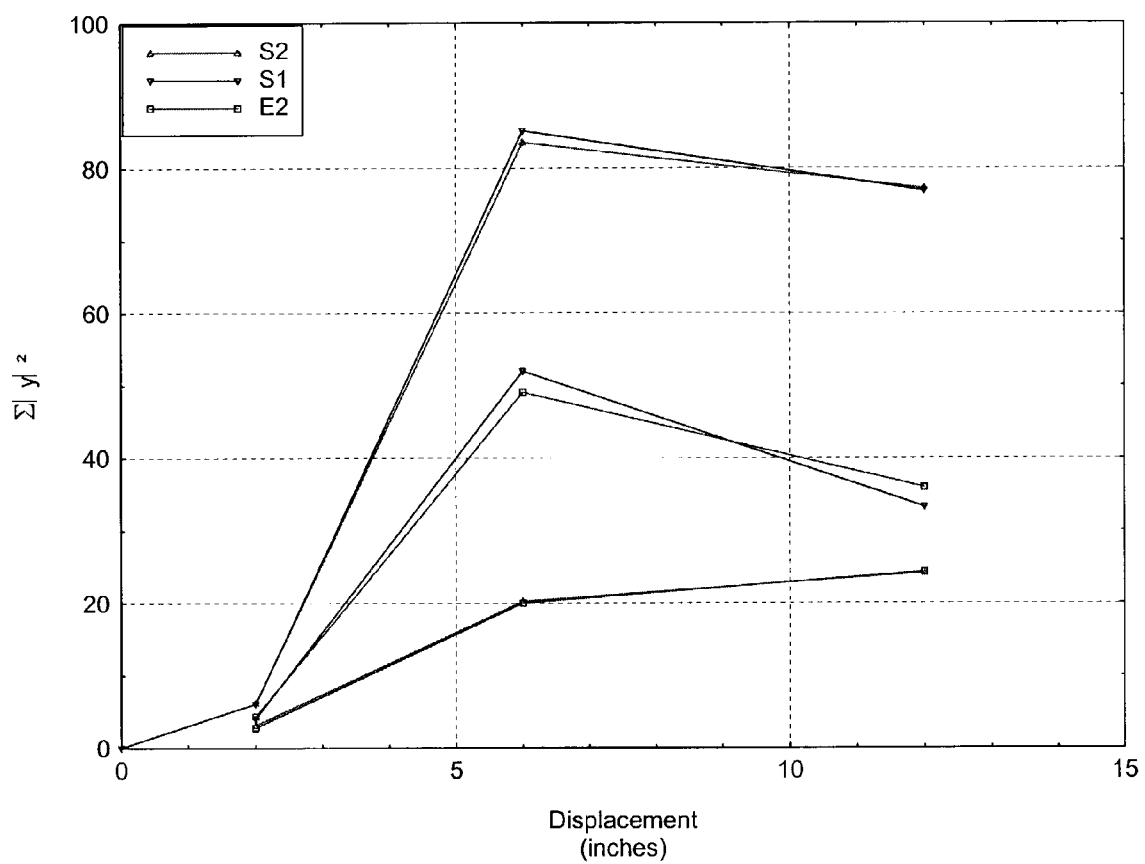
FIG. 8 compares the sum of the squared differences obtained from FIGS. 5 through 7 for different receiver loop positions.

FIGS. 6 and 7 show RFR signatures with the cargo pallet moved 6 in. and 12 in., respectively. The sum of the squared differences for these two cases (illustrated by the bold line at the lower right in each figure) ranges from approximately twenty for the 6 in. displacement and from approximately twenty four to approximately one hundred sixty five for the 12 in. displacement. The differences in these values depended on the particular combination of emitter and receiver loops utilized in any particular measurement. FIG. 8 compares the sum of the squared differences for several different antennae combinations and the 6 in. and 12 in. cargo pallet displacements. The different curves are labeled according to their respective receiver loop locations (E2, S1, or S2). In this case, "E" represents a loop located in one end (E1) or the other (E2) of the container whereas "S" represents a loop located in the side of the container at one of three different longitudinal positions (S1, S2, or S3). The two sets of nearly overlapping curves represent measurements made with the receiver loop and the cargo pallet in the same two locations, but with differing emitter loop locations. Note that the results shown in FIG. 8 are highly correlated with the receiver loop location and relatively independent of the emitter loop location. The same receiver loop produces essentially the same sum of squared differences regardless of where the RF energy is introduced (emitted) into the container. This result indicates that the RFR signature depends primarily on the location of the receiver loop relative to the cargo distribution within the container. Hence the RFR signature is not significantly influenced by the location of the emitter antenna. FIG. 8 also indicates that the difference signal (the sum of the squares) does not continue to increase with increasing cargo displacement. Therefore the magnitude of the sum of the squared differences is not highly correlated with the magnitude of the cargo displacement. In other words, moving the cargo twice as far does not necessarily result in a sum of squared differences twice as large.

Preferred embodiments of the present invention exploit these discoveries to detect changes in the distribution and/or composition of cargo in a cargo container; thereby allowing containers that do not indicate changes beyond a threshold to be eliminated as candidates for further inspection. In preferred embodiments of the present invention, RF energy is emitted into the interior of a cargo container. This energy causes a resonant response, which is received and processed to characterize the container and its contents. This response is then compared with one or more characterizations taken at other times to determine if the composition of the container and its cargo, along with the distribution of the cargo, has changed. The sensitivity of the RFR signature makes it difficult to partially unload a container and then reload it by replacing the contents in their exact prior positions. It also makes it difficult to add contents to the container, either through the door or by breaching one of the sides of that container. Therefore most any tampering with the container or its contents is identifiable as a change in the RFR signature.

A sufficiently full characterization of the mode spectrum can be converted by three-dimensional Fourier transform to produce an electromagnetic volume map of the contents of the container with resolution limited by the wavelength of the upper frequency in the spectrum. Similar Fourier-encoded two-dimensional and three-dimensional images are common in magnetic resonance imaging (MRI) applications. Such a full characterization of the RFR signature, while useful, requires more significant data acquisition and processing resources than for preferred embodiments of the present invention (for, among other purposes, unique identification of each mode by its relevant mode numbers and relative phase is necessary for the Fourier reconstruction). Such a system can identify not only changes in the contents, but can also quantify those changes in more detail by describing where and what changed and by how much.

Figure 9:
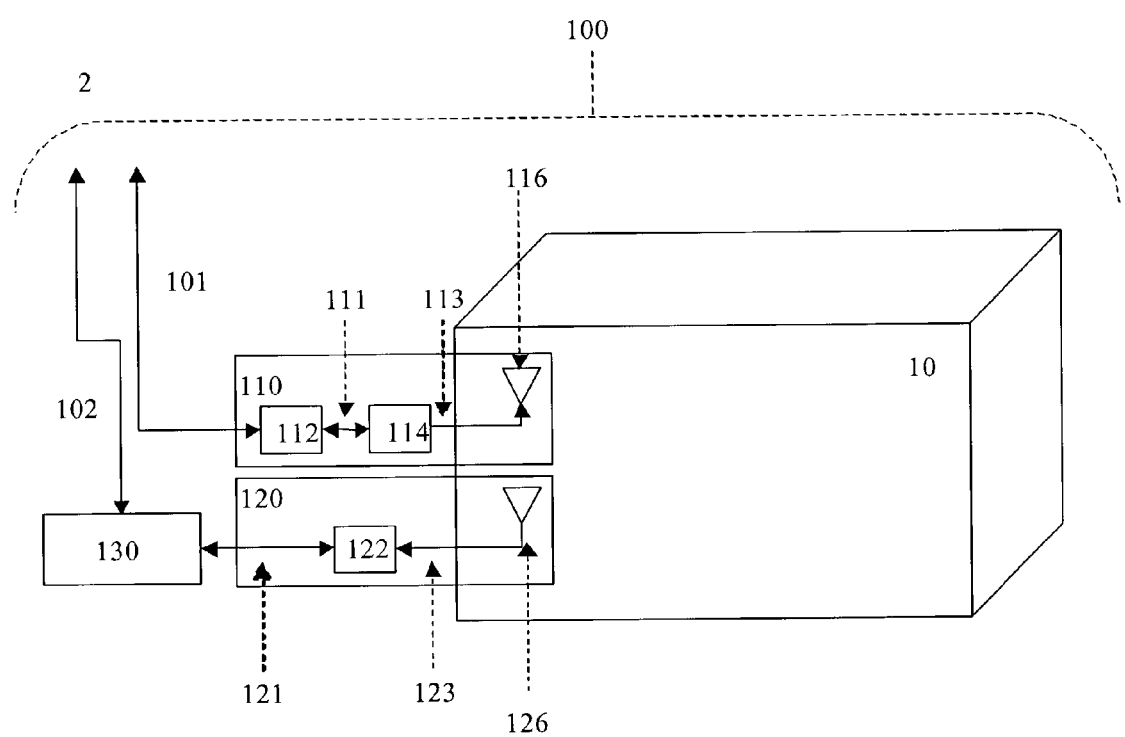
FIG. 9 is a schematic representation of a preferred embodiment of a system of the invention.

Referring to FIG. 9, a schematic of a preferred embodiment of a system of the invention is shown. A system 100 of the present invention includes an emitter 110, a receiver 120, and a processor 130. At least an antenna portion 116 of the emitter 110 is located within the container 10 during readings; and at least an antenna portion 126 of the receiver 120 also is located within the container 10 during readings. The emitter includes a signal generator 112 in communication with an amplifier 114 via path 111. The amplifier 114 provides an amplified signal to the emitter antenna portion 116 via path 113. The emitter antenna portion 116 radiates the energy of the amplified signal into the container 10. The receiver antenna portion 126 is connected to the signal detector 122 via pathway 123. The receiver 120 samples the response of the container. The receiver 120 is in communication with a processor 130 via communications path 121. The processor 130 compares the received response to an earlier response to determine if there has been a change. In some embodiments, the earlier response is a measured response. This earlier measured response can be stored in a memory device or can be physically encoded, e.g., into the manifest as e.g, a "bar code" or similar printed means. Interface between a system of the invention and a user 2 is through interface paths 101 (with the emitter 110) and 102 (with the processor 130). Such interface can range from simple "go"/"no go" indicators to Windows-based graphical user interfaces (e.g., controlling parameters such as emitter frequency, frequency range, and sweep rate; and providing analysis and display tools). Communications links useful as elements of interface paths are described elsewhere in this disclosure.

The detailed design of the emitter depends on implementation of various features and methods to improve the sensitivity, reduce the co-generated noise and "cross-talk"

between the emitter and receiver modules, and maximizing the lifetime of battery powered systems. Different RF generation techniques will generally have different advantages and disadvantages. It is left to the RF designer to determine the most propitious design for any particular embodiment of the present invention. The most basic implementation of an emitter is a simple swept frequency source and a suitable off-the-shelf RF amplifier. More complex implementations range from phase-locked loop (PLL) systems to direct digital synthesis (DDS) of the RF signal. Additional techniques that can be implemented to minimize cross-talk between the emitter and receiver include heterodyning and frequency mixing so that all signal processing is accomplished out-of-band. The choice of operating power level generally represents a compromise between acceptable SNR, lifetime of battery-powered systems, and the potential for RF power damaging the cargo.

In some embodiments, the signal generator is configured to generate a signal swept over the frequency range of interest. The rate of sweep generally depends on a compromise between SNR, RF power level, battery lifetime, and RF detector sensitivity. In other embodiments, the signal is characterized by a set of discrete frequencies whose spacings have been shown to be close enough to approximate a continuous RF spectrum or by a set of specific frequencies that have been demonstrated to provide adequate characterization of the contents of a particular container geometry. In other embodiments an RF pulse of energy ("ping") is applied to the interior of the container to generate the frequency response (the RFR signature) via a fast Fourier transform (FFT) on the received signal. Although Q considerations may add complication to the interpretation of the results with this method, future developments in electronics and low noise amplifiers can enable such a technique to be utilized.

The physical dimensions of a cargo shipping container, such as a one or two TEU size container, places the largest RF response to the container's geometry below 300 MHz. Frequencies above 300 MHz are used in deriving the RFR signature and relate directly to the distribution of the cargo inside the container and therefore to the magnitude of cargo shifts that can be detected. Higher frequencies are more sensitive to smaller shifts. As noted above for a one-TEU container, approximately 98% of the sum of squared differences is concentrated in frequencies above 300 MHz.

One embodiment of the RFR signature technique, described above and illustrated in FIGS. 2 through 7, sums the squares of all of the signature differences within a defined bandwidth to derive a single parameter representing the magnitude of changes in the spectrum. Other, methods of data analysis and presentation may prove equal or better in diagnosing changes in the contents of a container. The "sum of the squares" technique is utilized in the present embodiment only to illustrate a suitable but not necessarily the only technique of data analysis.

In preferred embodiments, the signal generator is controlled by a computer or microprocessor system that has been pre-programmed to activate RFR scans on either a periodic basis or via an internal or external triggered event. In preferred embodiments, the RFR scans are performed at regular intervals and the results stored in memory. Regular scans at relatively short intervals can be used to track thermal expansion effects on the dimensions of either the container or its contents. Such changes are relatively adiabatic and smooth. Experiments have shown that the short-term RFR signature is unique and stable. However, thermal effects produce changes in the signature that may be mistaken for alarm events if not properly accommodated. Regular scans will allow the detector system to track the relatively slow thermal changes without triggering an alarm.

In some embodiments, the emitter antenna 116 and the receive antenna 126 are connected to the same device. The emitter antenna and the receiver antenna need not be identical. Preferred embodiments employ loop antennae for both emitter and receiver. Loop antennae couple only to the RF magnetic field and are generally more compact than electric-field antennae. In addition, a degree of decoupling between the emitter and receiver antenna can be accomplished by perpendicular orientation of the loops. This approach mitigates coupling of emitted energy directly into the receiver. Hence received energy has been mode-converted by the container and its distribution of cargo. Alternative embodiments use RF electric-field coupling via simple or complex radiation emitters and sensors. Such embodiments can have advantages over loop antennae in particular situations. Combinations of loop antenna emitter with an RF electric sensor (or its converse), also have particular advantages. A multiplicity of receive antennae can be used to extract mode quantum numbers and relative phases, thereby enabling a 3D Fourier transform image of the inside of the container as discussed above.

Figure 10:
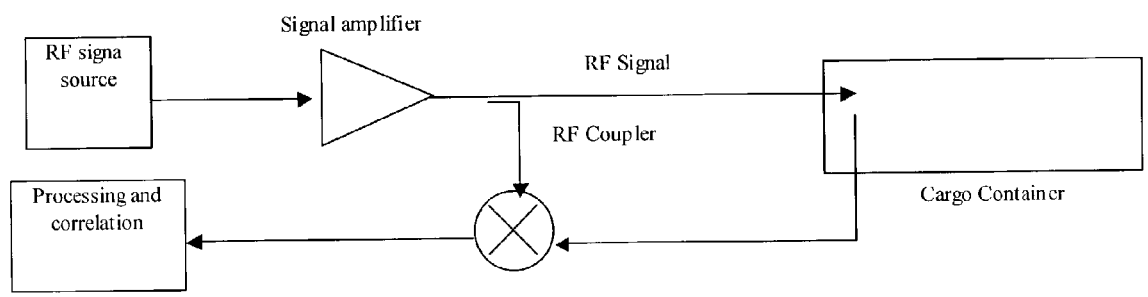
FIG. 10 is a schematic representation of a preferred embodiment of a system of the invention.

In preferred embodiments and as illustrated in FIG. 10, an RF coupler is joined to the emitter output and the coupled signal is mixed with the received signal to improve the isolation between the emitter and receiver (a technique referred to as heterodyning), thereby reducing the direct interference between the emitter and receiver that bypasses the container. With heterodyning, the received signal can be either down-converted to a lower frequency (or even to DC) or up-converted to a higher frequency. FIG. 10 is a schematic illustration of such an embodiment. An additional technique that is advantageous is to mix the received signal with a second swept frequency to convert the detected signal to a constant frequency. Narrow-band techniques can then be utilized to further process this constant frequency signal and improve the noise performance. The specific choice of receiver signal detection will depend on a compromise between signal acquisition sensitivity, noise and cross-talk immunity, signal processing requirements, and battery lifetime. One skilled in the art of RF electronics design can come up with a variety of different signal receiver/detector/deconvolution circuits to suit the specific requirements of a particular embodiment.

Specific advantages such as reduced computational complexity can be obtained by judicious placement of emitter and receiver antennas. For example, placement of a loop emitter antenna in the center of an 8 ft. by 8 ft. face will predominantly excite modes that have a non-zero magnetic field component in that location, e.g., modes with even-m and even-n. A loop with a horizontal (vertical) axis will excite only modes with a horizontal (vertical) RF magnetic field component in that specific location. Rotation of the loop by 45° will excite both horizontal and vertical RF magnetic field modes. As noted above, the RFR signature is relatively independent of the location of the emitter loop whereas the sum of squared differences, while sensitive to the proximity of the antenna to the cargo, is unique and stable. Therefore preferred embodiments allow the antennas to be placed anywhere in the container. Such an approach would facilitate a greater range of usages of systems of the invention, e.g., insertion of a device of the system as the final task immediately prior to closing and sealing the door, hiding the device somewhere inside the container disguised as cargo, or the creation of a "smart" container at the time of container manufacture.

The measured RFR signature is compared with an earlier RF resonant response to determine if there has been a change in the composition or arrangement of the contents of the cargo container. In some embodiments, RFR signatures are time-tagged to enhance traceability of the data to actual events. In some embodiments, the RFR signatures are tagged with geolocation of the reading, e.g., through a Global Positioning System (GPS) receiver, also enhancing the traceability of the data. In preferred embodiments, the processor 130 includes memory or other non-volatile means for storing the results of RFR signatures and associated data.

Figure 1:
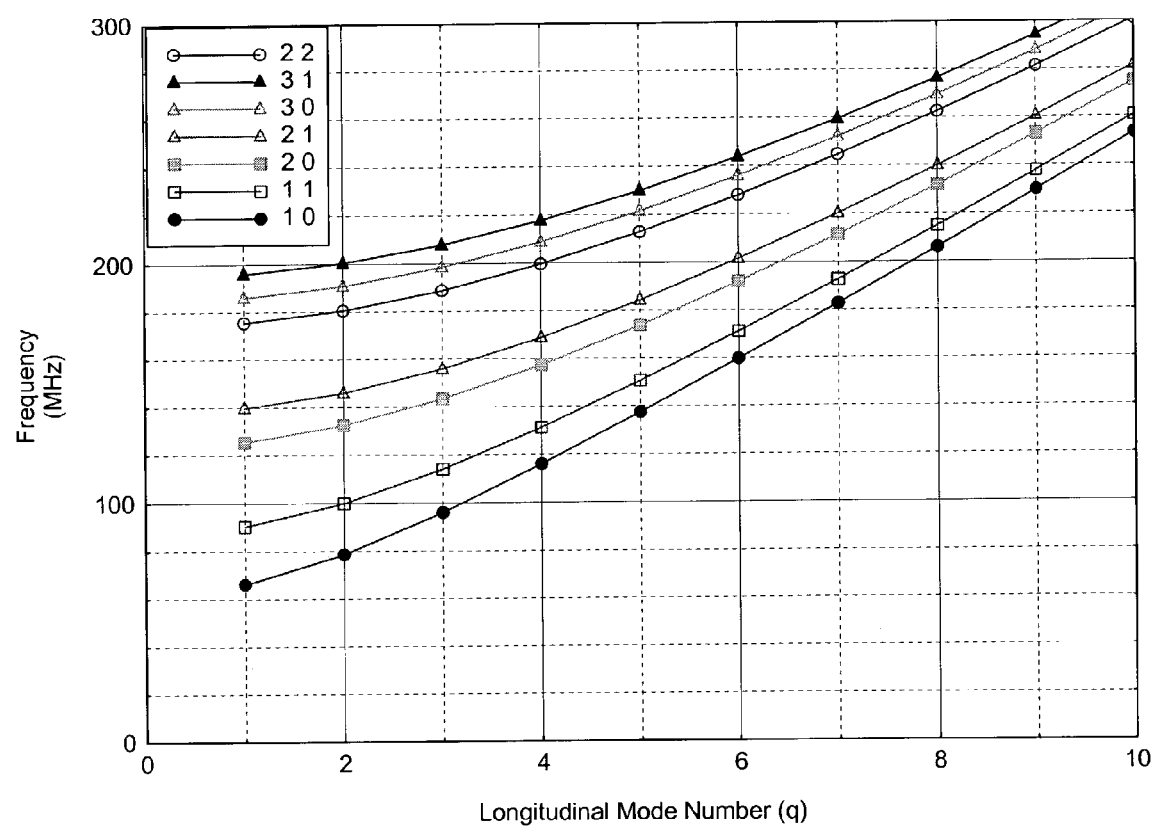
FIG. 1 is a plot of the theoretical modes of an 8 ft. by 8 ft.×20 ft. ideal copper container.

The 3D Fourier transform of the longitudinal and transverse modes can serve as the basis for deriving an image of the cargo within the container. The method of producing such an image is analogous to a one-dimensional transform of an arbitrary waveform. The Fourier transform defines the spectral content of the waveform, e.g., frequency spectrum, amplitude, and phase. The inverse transform of these values reproduces the arbitrary waveform. Similarly, the inverse Fourier transform of each branch of the mode structure shown in FIG. 1 provides a Fourier image of the contents within the encoding space defined by that particular branch. Decoding the measured mode spectrum in to m, n, and q along with the amplitude and phase values allows an inverse Fourier transform to produce a three-dimensional image of the cargo container contents. The resolution limit of this approach is determined by the wavelength of the maximum frequency of the RF energy used. For example, a 300 MHz upper limit would yield about a 50 cm resolution. Note however that the RFR signature has been demonstrated to be sensitive to cargo displacements significantly smaller than the theoretical resolution limit. The reason for this increased sensitivity is that changes in the RF mode pattern (the RFR signature) are a result of interference effects between RF modes that are generally more sensitive to changes than are linearly independent systems like Fourier Transforms. While not exactly analogous, holograms have similar properties. Displacements on the order of the wavelength of the light used to produce two holograms of the same view are easily visible as interference rings in the resulting image whereas the image itself has significantly less resolution.

Figure 11:
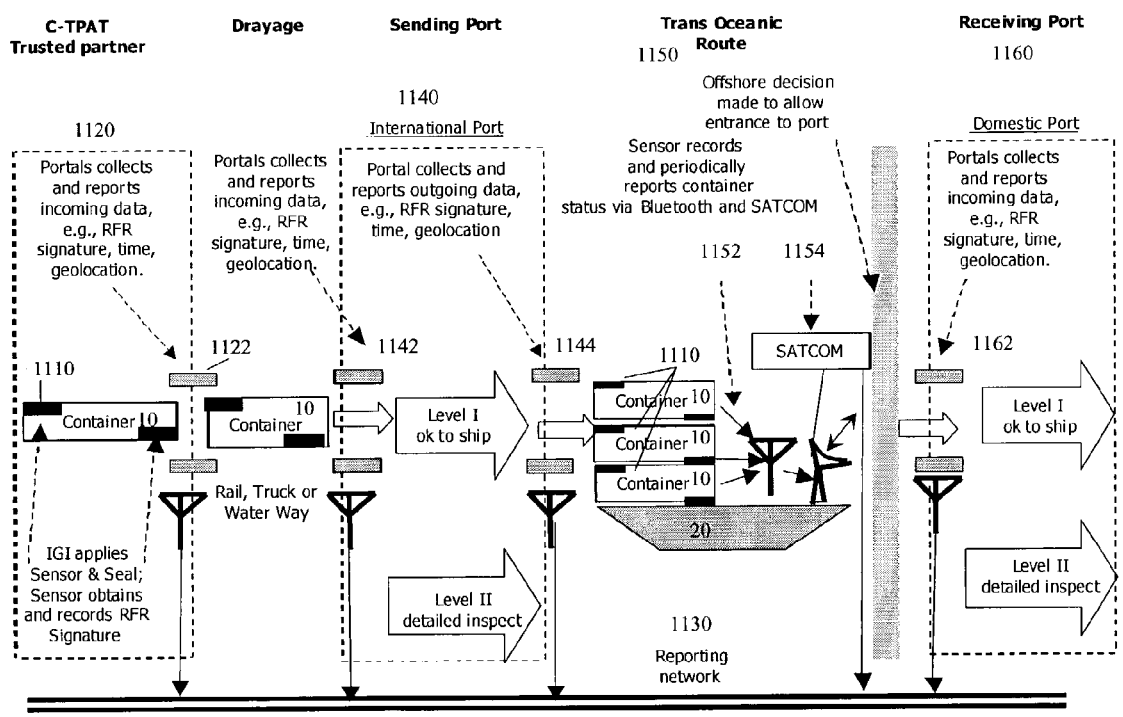
FIG. 11 illustrates an exemplary system of the present invention employing various types of communications links.

FIG. 11 illustrates an exemplary system and a method of using such a system of the present invention. In such a system, an Independent Goods Inspector places a sensor 1110 of the present invention (including an emitter, a receiver, and portions of a processor) within a container 10 before the container 10 departs a Customs-Trade Partnership Against Terrorism (C-TPAT) trusted partner's facility 1120. The sensor 1110 is activated, e.g., manually, or by program, to scan the loaded container 10. Each sensor 1110 is in communication with a portal 1122 (via, e.g., a Bluetooth connection) to report scan information when the sensor 1110 passes within range of the portal 1122. Each portal 1122 is connected to a reporting network 1130 upon which the reported data is available, and upon which further processing and data fusion can be accomplished by methods known to those skilled in the art. Upon arrival at a sending port 1140, a sending port arrival portal 1142 can communicate with the sensor 1110 to command the sensor to perform a scan and to receive the results of the scan. In addition, scanned information (obtained e.g., via command from the portal, via manually triggered scan, via program) can be reported from the sensor 1110 through the portal 1142 to the reporting network 1130. At this point, those containers having scans that show changes (above a threshold) in composition or distribution of cargo can be segregated for detailed inspection. Those containers 10 having scans showing no change in cargo composition or distribution (or, e.g., change below a threshold, change non-indicative of tampering) can be cleared for loading onto a ship. Note that additional scans can be initiated manually, or via a program, or via remote initiation at various points along the container's route. For example, another scan(s) can be initiated and communicated through the reporting network as the sensor 1110 passes within the operable vicinity of a sending port departure portal 1144.

Aboard the ship 20 multiple sensors 1110 can continue to scan, receive commands, report status and results to near-container portions of the system through communications links described elsewhere in this disclosure. By way of non-limiting illustration, FIG. 11 shows the on-ship communications link between the sensors 1110 and the reporting network 1130 as a Bluetooth-compatible network 1152 and a satellite communications link 1154. The reporting network 1130 can take the form of, inter alia, the Internet, a secure virtual private network, a dedicated network, and other communications means know to those skilled in the art.

The availability, on the reporting network, of data from shipboard sensors enables a decision regarding whether to allow entrance into the receiving port while the ship is still well offshore. Upon arrival at a receiving port 1160, a receiving port arrival portal 1162 can communicate with the sensor 1110 to command the sensor to perform a scan and to receive the results of the scan. In addition, scanned information (obtained e.g., via command from the portal, via manually triggered scan, via program) can be reported from the sensor 1110 through the portal 1162 to the reporting network 1130. At this point, those containers having scans that show changes (above a threshold) in composition or distribution of cargo can be segregated for detailed inspection. Those containers 10 having scans showing no change in cargo composition or distribution (or, e.g., change below a threshold, change non-indicative of tampering) can be cleared for further distribution.

To facilitate understanding of various embodiments of the present invention, it is useful to define three areas: in-container, near-container, and remote. In each embodiment, the emitter antenna portion 116 and the receiver antenna portion 126 are in-container during reading. In general, elements of a system of the invention can be partitioned between these three zones in a manner tailored to the specific application. The following paragraphs describe several illustrative embodiments.

In one embodiment of the invention, the signal generator 112, amplifier 114, emitter antenna 116, receive antenna 126, any receiver electronics 122, processor 130, a power source, and interface elements (e.g., a visual/audio indication of alarm or non-alarm state, a manual activation means) are contained in a single package for introduction into the cargo container. In this embodiment, the package is introduced into the container before sealing the container. The package reads the RF resonant signature of the cargo container and its distribution of contents. The package takes at least one additional reading. The results are read via interrogation along the route of the container.

In another preferred embodiment, the antenna(s) 116/126 are accessible electrically through the outer wall of the container, e.g., by using N-type feed-throughs known to those skilled in the art.

In another preferred embodiment, the emitter 110 and receiver 120 are placed inside a container 10; communications links 101 and 121 are implemented as near-container communications, e.g., Bluetooth-compatible; and processing 130, control, and user interface functions are implemented on a computing/communications platform, e.g., a personal computer, near the container.

In another embodiment, a system of the invention includes a cargo container 10 with at least one emitter antenna 116 and at least one receive antenna 126. The emitter antenna is located inside the container 10, and is operative to transmit RF energy at frequencies substantially above the lowest resonant frequencies of the empty container. The emitter antenna feed 113 is accessible from outside the container to in order to be supplied RF energy. At least one receive antenna 126 also is located inside the container. The receive antenna 126 is operative to receive resonant RF energy at frequencies substantially above the lowest resonant frequencies of the empty container. The receive antenna output 123 is accessible from outside the container. Receiver electronics 120, processor 130, signal generator 112, signal amplifier 114 and user interfaces 101, 102 are located outside the container and may be a single subsystem used to interface with containers of the invention sequentially. Such a subsystem can be handheld.

We claim:

1. A system for characterizing a cargo container and any contents thereof, the system comprising:
   at least one emitter operative to emit at least a first radio frequency (RF) energy and second RF energy into an interior of the cargo container,
   at least one receiver operative to receive at least:
      a first RF response:
         related to the first RF energy, and
         characteristic of the container and any contents thereof at the time of emission of the first RF energy; and
      a second RF response:
         related to the second RF energy, and
         characteristic of the container and any contents thereof at the time of emission of the second RF energy, and
   at least one processor operative to compare a plurality of RF responses.

2. A system for characterizing a cargo container and any contents thereof, the system comprising:
   means to emit at least a first radio frequency (RF) energy and a second RF energy into an interior of a cargo container,
   means to receive at least:
      a first RF response:
         related to the first RF energy, and
         characteristic of the container and any contents thereof at the time of emission if the first RF energy and
      a second RF response:
         related to the second RF energy, and
         characteristic of the container and any contents thereof at the time of emission if the first RF energy, and
   means to compare a plurality of RF responses.

3. A method for characterizing a cargo container and any contents thereof, the method comprising:
   providing a system comprising:
      at least one emitter operative to emit at least a first radio frequency (RF) energy and second RF energy,
      at least one receiver operative to receive at least a first RF response related to the first RF energy and a second RF response relate to the second RF energy, and
      at least one processor operative to compare a plurality of RF responses; and
   via the system:
      emitting the first RF energy within the container;
      receiving the first RF response of the container and any contents thereof to the first RF energy,
      emitting the second RF energy within the container,
      receiving the second RF response of the container and any contents thereof to the second RF energy, and
      comparing the second RF response with the first RF response.

4. A method for characterizing a cargo container and any contents thereof, the method comprising:
   providing a system comprising:
      means to emit at least a first radio frequency (RF) energy and a second RF energy,
      means to receive at least a first RF response related to the first RF energy and a second RF response relegated to the second RF energy, and
      means to compare a plurality of RF responses; and
   via the system:
      emitting the first RF energy within the container,
      receiving the first RF response of the container and any contents thereof to the first RF energy,
      emitting the second RF energy within the container,
      receiving the second RF response of the container and any contents thereof to the second RF energy, and
      comparing the second RF response with the first RF response.

5. A method for detecting changes in at least one of the composition and distribution of cargo within a cargo container, the method comprising:
   providing a system comprising:
      at least one emitter operative to emit at least a first radio frequency (RF) energy and second RF energy,
      at least one receiver operative to receive at least a first RF response related to the first RF energy and a second RF response related to the second RF energy, and
      at least one processor operative to compare a plurality of RF response; and
   via the system:
      emitting the first RF energy within the container,
      receiving the first RF response of the container and the container contents to the first RF energy,
      emitting the second RF energy within the container,
      receiving the second RF response of the container and the container contents to the second RF energy, and
      comparing the second RF responses with the first RF response.

6. A method for detecting changes in at least one of the composition and distribution or cargo within a cargo container, the method comprising:
   providing a system comprising:
      means to emit at least a first radio frequency (RF) energy and a second RF energy,
      means to receive at least a first RF response related to the first RF energy and a second RF response related to the second RF energy, and
      means to compare a plurality of RF responses; and via the system:
   emitting the first RF energy within the container,
   receiving the first RF response of the container and the container contents to the first RF energy,
   emitting the second RF energy within the container,
   receiving the second RF response of the container and the container contents to the second RF energy, and
   comparing the second RF response with the first RF response.

7. A method for characterizing a cargo container, the method comprising:
   emitting a first RF energy within the container,
   receiving a first RF responses of the container and the container contents to the first RF energy,
   emitting a second RF energy within the container,
   receiving a second RF responses of the container and the container contents to the second RF energy, and
   comparing the second RF response with the first RF response.

8. A method for characterizing a cargo container the method comprising:
   determining a first radio frequency (RF) resonant response of the interior of the container,
   determining a second RF resonant response of the interior of the container, and
   comparing the second RF response with the first RF response.

9. A method for detecting changes in at least one of the composition and distribution or cargo within a cargo container, the method comprising;
   determining a first radio frequency (RF) resonant response of the interior of a container,
   determining a second RF resonant response of the interior of a container, and
   comparing the second RF response with the first RF response.

10. A cargo container comprising:
    at least one emitter antenna:
       located inside the container, and
       operative to transmit radio frequency (RF) energy at frequencies above the lowest resonant frequencies of the empty container; and
    at least one receiving antenna;
       located inside the container, and
       operative to receive resonant RF energy at frequencies above the lowest resonant frequencies of the empty container.

11. The cargo container of claim 10 wherein the at least one emitter antenna is accessible for energizing from outside the container.

12. The cargo container as in claim 10 wherein the at least one emitter antenna is associated with the container and the authorized contents of the container.

13. A method for detecting changes in at least one of the composition and distribution of cargo within a cargo container, the method comprising:
    providing the cargo container:
    comprising:
       at least one emitter antenna, the emitter antenna:
          located inside the container, and
          operative to transmit radio frequency (RF) energy at frequencies above the lowest resonant frequencies of the empty container; and
       at least one receive antenna:
          located inside the container, and
          operative to receive resonant RF energy at frequencies above the lowest resonant frequencies of the empty container; and
       wherein a first radio frequency signature is associated with the container and the inspected contents of the container;
    determining a second RF signature of the container and its contents; and
    comparing the second RF signature with the first RF signature.

14. A method for detecting changes in at least one of the composition and distribution of cargo within a cargo container, the container having associated with it a first radio frequency (RF) signature of the container and its inspected contents, the method comprising:
    determining a second RF signature of the container and its contents, and comparing the second RF signature with the first RF signature.

* * * * *